United States Patent
Yamazaki et al.

(10) Patent No.: US 7,470,031 B2
(45) Date of Patent: Dec. 30, 2008

(54) IMAGE DISPLAY DEVICE

(75) Inventors: Tetsuro Yamazaki, Suwa (JP);
Masatoshi Yonekubo, Hara-mura (JP);
Akira Shinbo, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 392 days.

(21) Appl. No.: 11/298,489

(22) Filed: Dec. 12, 2005

(65) Prior Publication Data
US 2006/0209264 A1 Sep. 21, 2006

(30) Foreign Application Priority Data
Mar. 15, 2005 (JP) .............................. 2005-072431

(51) Int. Cl.
G03B 21/20 (2006.01)
G03B 21/22 (2006.01)
(52) U.S. Cl. ......................................... 353/85; 348/744
(58) Field of Classification Search .................. 353/77, 353/52, 34, 37, 85, 443–461, 50, 82, 89, 353/90, 93; 348/742, 743, 771, 744, 818–820; 359/887–892, 460; 374/139, 161; 361/65, 361/93.8, 103
See application file for complete search history.

(56) References Cited

U.S. PATENT DOCUMENTS

| | | | | |
|---|---|---|---|---|
| 5,991,319 | A * | 11/1999 | Zamel et al. | 372/34 |
| 6,943,864 | B2 * | 9/2005 | Guiragossian et al. | 349/161 |
| 2005/0007562 | A1 * | 1/2005 | Seki et al. | 353/98 |
| 2005/0024704 | A1 | 2/2005 | Sakai | |
| 2005/0140930 | A1 * | 6/2005 | Dvorkis et al. | 353/31 |
| 2005/0190423 | A1 * | 9/2005 | Sakai | 359/212 |

FOREIGN PATENT DOCUMENTS

JP A 2002-281532 9/2002

* cited by examiner

*Primary Examiner*—Andrew T Sever
*Assistant Examiner*—Danell L Owens
(74) *Attorney, Agent, or Firm*—Oliff & Berridge PLC

(57) ABSTRACT

An image display device includes a light source that supplies beam-like light; a scanning portion that scans light from the light source to display an image by using light from the scanning portion; and a connecting portion that electrically connects the light source and an external power source that supplies electric power to the light source; wherein the connecting portion is disposed in an optical path of light from the light source past the scanning portion, and, when light is irradiated from the scanning portion at energy equal to or more than predetermined energy, disconnects an electrical connection between the light source and the external power source.

8 Claims, 6 Drawing Sheets

IMAGE DISPLAY DEVICE

BACKGROUND

1. Technical Field

The present invention relates to a technology of an image display device, in particular, an image display device in which laser light modulated in accordance with an image signal is made to transmit a screen to display an image.

2. Related Art

In recent years, a laser projector where an image is displayed with laser light is proposed. The laser light is high in the monochromaticity and directivity. Accordingly, the laser projector has an advantage in that an image excellent in the color reproducibility can be obtained. In the laser projector, such a measure is taken that a light source that supplies the laser light is hermetically sealed in a chassis and only laser light that is dispersed in the intensity owing to scanning is supplied outside of the chassis, and thereby laser light larger in the intensity than a predetermined intensity is inhibited from coming out of the chassis. As a result, for instance, when such an anomaly that while the laser light is supplied from the light source the laser light is stopped in scanning is caused, in some cases, laser light larger in the intensity than a predetermined intensity may be exited outside of the chassis. A technology that avoids a case where laser light larger in the intensity than a predetermined intensity is exited outside of the chassis is proposed in, for instance, JP-A No. 2002-281532.

The technology proposed in JP-A No. 2002-281532 is constituted so that when a phenomenon that may cause a case where the laser light large in the intensity is exited outside of the chassis is detected, the laser light is shut via a control circuit. In the case of such a configuration, since an anomaly is considered caused in the control circuit as well, it is difficult to assuredly cut the laser light. As a configuration with which the laser light is shut without intermediates of the control circuit, it is considered to use an optical member that is damaged or modified owing to irradiation of the laser light larger in the intensity than a predetermined intensity. In this case, when the damaged or modified optical member shuts the laser light, a situation that the laser light large in the intensity is exited outside of the chassis can be avoided. In the case of such a configuration, the laser light can be shut from emitting outside. However, when the control circuit is not used together, the laser light is continued supplying inside of the chassis. From this, in the case where an anomaly is caused in the scanning of the laser light, it is considered that, owing to the continuation of supply of the laser light inside of the chassis, in some cases, an inconvenience such as the damage of a device may not be avoided. Thus, in an existing technology, there is a problem in that when an anomaly is caused in the scanning of beam-like light, in some cases, an inconvenient situation may not be avoided from occurring.

SUMMARY

An advantage of the invention is to provide an image display device that can assuredly avoid an inconvenient situation from occurring when an anomaly is occurred to the scanning of beam-like light.

According to an aspect of the invention, an image display device includes a light source that supplies beam-like light and a scanning portion that scans light from the light source, light from the scanning portion displaying an image. The image display device further includes a connecting portion that electrically connects the light source and an external power source that supplies electric power to the light source. The connecting portion is disposed in an optical path of light from the light source and past the scanning portion, and, when light is irradiated from the scanning portion at energy equal to or more than predetermined energy, the electrical connection between the light source and the external power source is cut off.

For instance, when owing to an anomaly of the scanning portion the beam-like light is stopped from scanning, the beam-like light is kept supplying. Accordingly, on the connecting portion, light is irradiated at energy equal to or more than the predetermined energy. The predetermined energy is energy, for instance, substantially same as that is imparted on an irradiation surface when light highest in the intensity in accordance with an image signal is scanned. When light is irradiated at energy equal to or more than the predetermined energy, the connecting portion cuts the electrical connection between the light source and the external power source. In the image display device, the connecting portion cuts the electrical connection to stop the supply of electric power from the external power source to the light source. When the electric power is stopped from supplying from the external power source, the light source stops supplying the laser light. Since owing to the stoppage of supply of the electric power to the light source to stop the supply of the laser light, rather than controlling the light source through a complicated control circuit, the laser light can be directly and assuredly shut off. Furthermore, before a situation where the laser light is emitted outside of the chassis is caused, at the time when the light is irradiated at energy equal to or more than the predetermined energy, the supply of the laser light inside of the chassis can be stopped. Accordingly, inconvenient situations such as damage of a device owing to continuation of the supply of the laser light can be avoided. Thereby, an image display device where, when an anomaly in the scanning of the beam-like light is caused, inconvenient situations can be assuredly avoided from occurring can be obtained.

Furthermore, it is preferable that, in the connecting portion, a member that melts when the light is irradiated at energy equal to or more than the predetermined energy from the scanning portion is desirably used. Thereby, when the light is irradiated at energy equal to or more than the predetermined energy from the scanning portion, the light source and the external power source can be electrically disconnected.

Furthermore, it is preferable that the scanning portion is driven in accordance with a driving force to scan light from the light source and the connecting portion is disposed at a position where light propagating through the scanning portion of which driving force is stopped enters. The case where the scanning portion is stopped from driving owing to the anomaly is considered ordinarily in many cases due to inability of generating the driving force owing to some reasons even when a current is supplied or a voltage is applied. When the connecting portion is disposed at a position where light propagating through the scanning portion of which driving force is stopped enters, in the case of the driving force of the scanning portion being stopped, the supply of the beam-like light from the light source can be cut off.

Still furthermore, it is preferable that the scanning portion makes light modulated in accordance with an image signal scan in an image display area, and, when the driving force is stopped, the light is entered in a position different from a position on the image display area. When the scanning portion is configured so that when the driving force is stopped, the light is entered in a position different from a position on the image display area, the connecting portion can be disposed at a position that does not shield light that enters the image display area. Thereby, in a mode that does not at all affect on the image, the connecting portion can be disposed.

Furthermore, it is preferable that a screen that allows transmitting light from the scanning portion is possessed and the connecting portion is disposed between pixels of an image displayed on the screen. As the connecting portion that is disposed between pixels, for instance, a black matrix portion that reduces the reflection of the ambient light from an observer side can be used. When the connecting portion is configured so as to dispose between the pixels on the screen, when light is irradiated on the screen at energy equal to or more than the predetermined energy, the beam-like light from the light source can be stopped from supplying. Still furthermore, irrespective of a position where the beam-like light is stopped on the screen, the beam-like light can be stopped from supplying. Furthermore, when the connecting portion is disposed between the pixels, in a mode that does not at all affect on the image, the connecting portion can be disposed.

Still furthermore, it is preferable that a screen that allows transmitting light from the scanning portion and a reflecting portion that reflects light from the scanning portion in a direction of the screen are possessed, and the connecting portion is disposed on the reflecting portion. When the connecting portion is disposed on the reflecting portion, when light enters the reflecting portion at energy equal to or more than the predetermined energy, the beam-like light from the light source can be stopped from supplying.

Furthermore, it is preferably formed so that the scanning portion may make light from the light source scan in a first direction and a second direction substantially perpendicular to the first direction and the connecting portion may tilt to both the first and second directions. When the connecting portion is formed so as to tilt to both the first and second directions where the light is scanned, when the scanning in any one of the first and second directions is stopped, the light from the scanning portion can be made enter the connecting portion. Thereby, with a simple configuration and effectively, the anomaly of the scanning portion can be detected, and thereby an inconvenient situation can be avoided from occurring.

Still furthermore, it is preferable that the reflecting portion has a reflective film that reflects light from the scanning portion and the connecting portion is disposed on a side opposite to a side of the screen relative to the reflective film. Of the reflecting portion, on a side opposite to the side of the screen relative to the reflective film the connecting portion is disposed. Thereby, the connecting portion can be disposed at a position where normally scanning beam-like light is not shielded. When, owing to the anomaly of the scanning portion, energy equal to or more than the predetermined energy enters the reflecting portion, for instance, the reflective film is melted together with the connecting portion. Of the reflective film, when a portion where laser light is irradiated is melted, the reflecting portion stops reflecting the laser light. Thereby, firstly, the laser light can be stopped from exiting from the screen. Furthermore, because the connecting portion is melted, electrical connection between the light source and the external power source can be cut off. Thereby, the connecting portion can be disposed in a mode that does not at all affect on an image, and, when light enters the reflecting portion at energy equal to or more than the predetermined energy, the beam-like light from the light source can be cut off.

BRIEF DESCRIPTION OF THE DRAWINGS

The invention will be described with reference to the accompanying drawings, wherein like numbers reference like elements.

DESCRIPTION OF EXEMPLARY EMBODIMENTS

In what follows, with reference to the drawings, examples according to the invention will be detailed.

EXAMPLE 1

Figure 1:
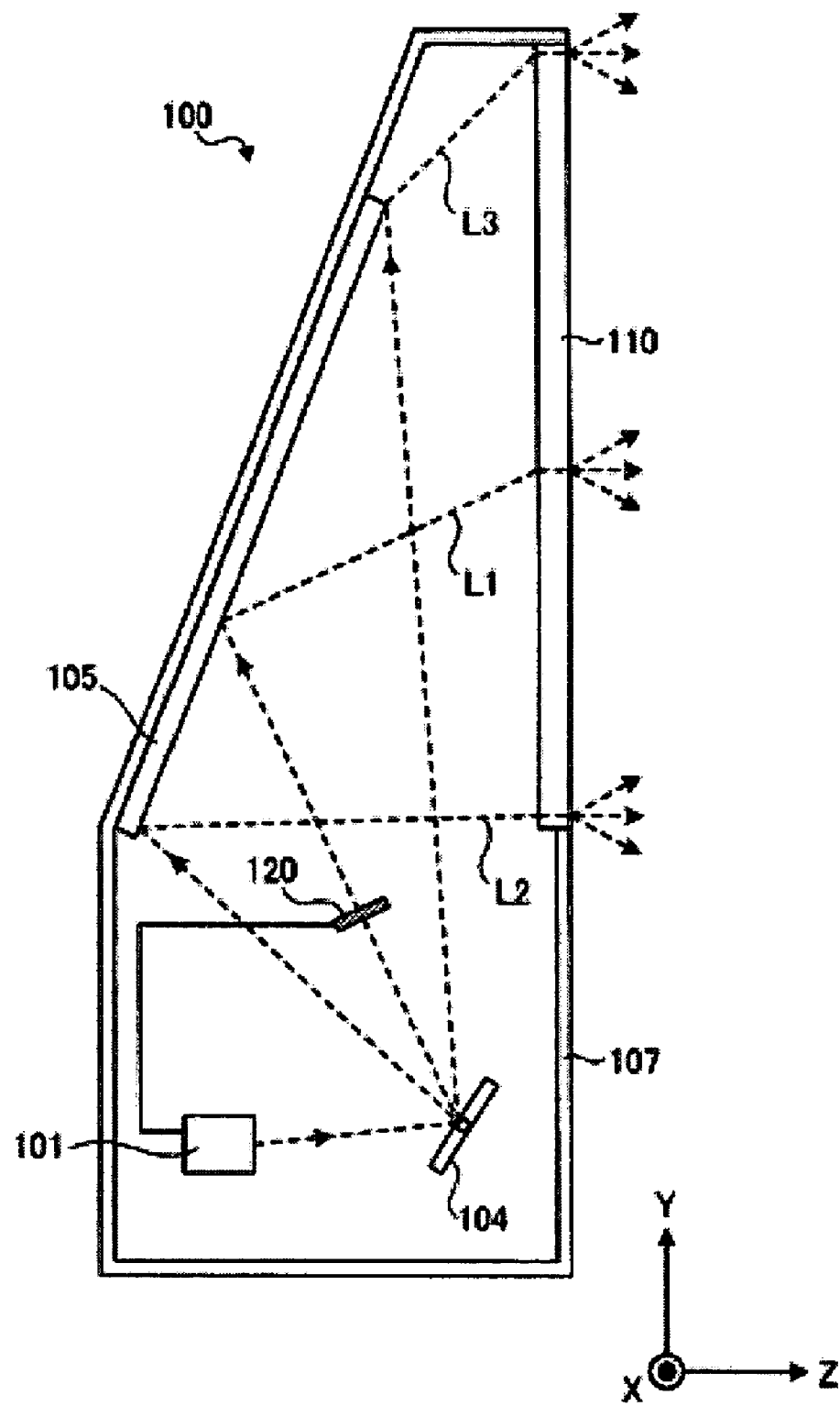
FIG. 1 is a diagram showing a schematic configuration of an image display device according to Example 1 of the invention.

FIG. 1 shows a schematic configuration of an image display device 100 according to Example 1 of the invention. The image display device 100 is a so-called rear projector where laser light is supplied on one surface of a screen 110 and light exited from the other surface of the screen 110 is observed to see an image. The image display device 100 displays an image with light from a scanning portion 104. A light source 101 supplies red laser light, green laser light and blue laser light that are beam-like light, after modulating, respectively, in accordance with an image signal. In the light source 101, a semiconductor laser or a solid laser provided with a modulator for modulating the laser light may be used. As the modulation in accordance with an image signal, any one of amplitude modulation and pulse width modulation may be used. On an exit side of the light source 101, a shaping optical system that shapes laser light L into a beam shape of a diameter of, for instance, 0.5 mm may be disposed. The laser light from the light source 101 enters a scanning portion 104. The scanning portion 104 makes the laser light from the light source 101 scan in two-dimensional directions.

Figure 2:
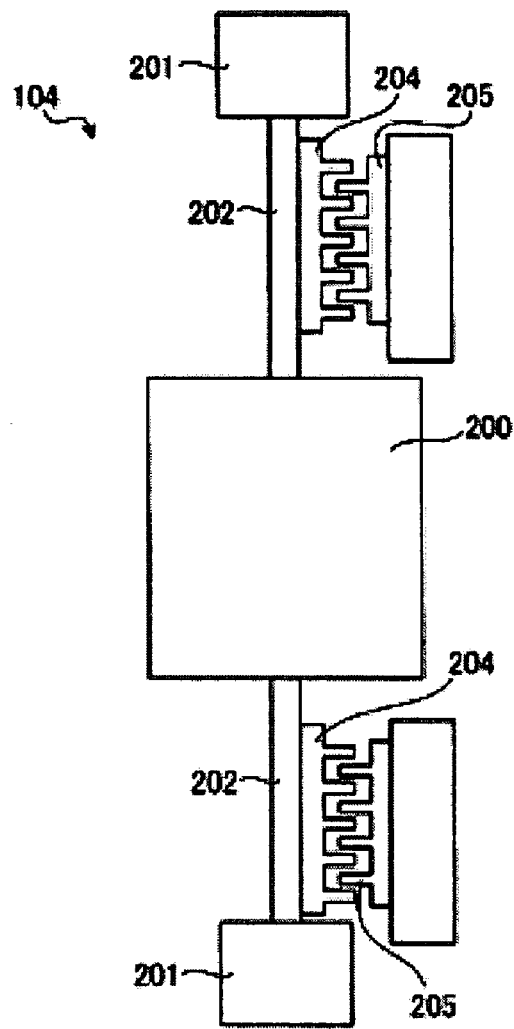
FIG. 2 is a diagram showing a schematic configuration of a scanning portion.

FIG. 2 is a diagram showing a schematic configuration of the scanning portion 104. Here, a configuration for scanning the laser light in one-dimensional direction of two-dimensional directions is illustrated and described. The scanning portion 104 has a flat reflection mirror 200. The scanning portion 104 vibrates the reflection mirror 200 that is in a state of reflecting the laser light from the light source 101 to scan the laser light. By forming a metal thin film of a highly reflective member such as aluminum or silver, the reflection mirror 200 can be formed. The reflection mirror 200 is linked to a fixing portion 201 with a torsion spring 202 that is a rotation axis. The torsion spring 202 rotates the reflection mirror 200 to this side of the page space and the other side thereof. The reflection mirror 200 may be formed into, without restricting to a square shape, for instance, a circle.

The reflection mirror 200 is driven due to an electrostatic force that works between comb-shaped electrodes. The torsion spring 202 is provided with a movable side electrode 204. The movable side electrode 204 is a comb-shaped electrode that moves as the torsion spring 202 rotates. In the proximity of the movable side electrode 204, a fixed side electrode 205 is disposed. The fixed side electrode 205 is a comb-shaped electrode disposed so that it may be always fixed irrespective of the rotation of the torsion spring 202. The movable side electrode 204 and fixed side electrode 205 are disposed so that comb-shaped portions thereof may be engaged with each other.

Figure 3:
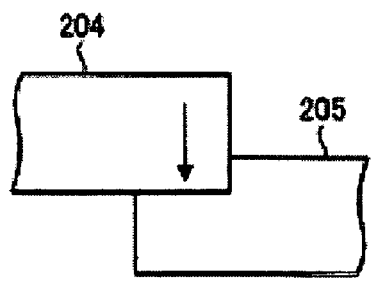
FIG. 3 is a diagram that describes a drive of a reflection mirror.

FIG. 3 is a diagram describing a drive of the scanning portion 104 owing to the movable side electrode 204 and fixed side electrode 205 and showing a configuration where a comb-shaped portion of the movable side electrode 204 and that of the fixed side electrode 205 are seen from a side surface. Before a voltage is applied between the movable side electrode 204 and fixed side electrode 205, the comb-shaped portion of the movable side electrode 204 and that of the fixed side electrode 205 are located displaced up and down each other. From this state, when a voltage is applied between the movable side electrode 204 and fixed side electrode 205, between the comb-shaped portion of the movable side electrode 204 and that of the fixed side electrode 205, in accordance with a potential difference between the movable side electrode 204 and fixed side electrode 205, an electrostatic force that attracts each other is generated.

The movable side electrode 204 operates due to a resultant force of the electrostatic force and the restoring force of the torsion spring 202. When the electrostatic force between the comb-shaped portion of the movable side electrode 204 and that of the fixed side electrode 205 becomes larger than a force necessary for twisting the torsion spring 202, the movable side electrode 204 moves toward a lower side shown with an arrow mark. The reflection mirror 200 rotates with the torsion spring 202 at a center, until the electrostatic force and the restoring force of the torsion spring 202 come to equilibrium, owing to the electrostatic force in accordance with a potential difference between the movable side electrode 204 and the fixed side electrode 205.

In the next place, when the application of a voltage between the movable side electrode 204 and the fixed side electrode 205 is stopped, the electrostatic force generated between the comb-shaped portion of the movable side electrode 204 and that of the fixed side electrode 205 disappears. Upon disappearance of the electrostatic force, the movable side electrode 204, owing to the restoring force of the torsion spring 202, moves in a direction returning to an original position. When the movable side electrode 204 moves in a direction that returns to an original position, the reflection mirror 200 rotates in a direction reversal to that up to now. During the electrostatic force being stopped from generating, the reflection mirror 200, owing to the restoring force of the torsion spring 202, rotates with the torsion spring 202 at a center. The reflection mirror 200, owing to the repetition of the application and stoppage of a voltage between the movable side electrode 204 and the fixed side electrode 205, reciprocates.

The movable side electrode 204 and the fixed side electrode 205, without restricting to a configuration where these are disposed on one side of the torsion spring 202, may be disposed on both sides of the torsion spring 202. Thus, the scanning portion 104 is driven in accordance with the electrostatic force that is a driving force to scan laser light from the light source 101. The scanning portion 104 and the respective configurations for driving the scanning portion 104 can be formed by, for instance, a MEMS (Micro Electro Mechanical Systems) technology. In order to scan laser light two-dimensionally, the scanning portion 104 may be configured so as to use, other than one reflection mirror that is two-dimensionally displaced, a reflection mirror that makes the laser light scan in a horizontal direction and a reflection mirror that makes the laser light scan in a vertical direction.

The scanning portion 104, without restricting to a configuration where the electrostatic force that operates between the comb-shaped electrodes is used to drive, may be driven with other driving method that uses the electrostatic force. Furthermore, the scanning portion 104 is not restricted to a configuration where the electrostatic force in accordance with the potential difference is used to drive. For instance, the scanning portion 104 may be configured so as to drive with the electromagnetic force or to drive with the stretching force of a piezoelectric element. When the electromagnetic force is used, the electromagnetic force is generated, for instance, between the reflection mirror 200 and the permanent magnet in accordance with electric current to displace the reflection mirror 200.

Returning to FIG. 1, the laser light reflected at the scanning portion 104 enters a reflecting portion 105. The reflecting portion 105 is an internal surface of the chassis 107 and disposed at a position facing the screen 110. The laser light entered the reflecting portion 105 proceeds toward the screen 110. The chassis 107 closely seals a space inside of the chassis 107. The screen 110 is disposed on one predetermined surface of the chassis 107. The screen 110 is a transmissive screen that allows the laser light modulated in accordance with the image signal to transmit. The laser light is scanned, on the screen 110, in an X-direction that is a horizontal direction and a Y-direction that is a vertical direction. The light from the reflecting portion 105, after entering from a surface on an internal side of the chassis 107 of the screen 110, exits from a surface on an observer side. The observer observes light exited from the screen 110 and sees an image.

On an optical path between the scanning portion 104 and the reflecting portion 105, a connecting portion 120 is disposed. The connecting portion 120 electrically connects the light source 101 and an external power source (not shown in the drawing) for supplying electric power to the light source 101. To the light source 101, electric power is supplied through the connecting portion 120 from the external power source. Furthermore, the connecting portion 120 is disposed at a position where laser light L1 that proceeds through the scanning portion 104 where the electrostatic force that is a driving force is stopped from generating enters. When the electrostatic force is stopped from generating, the reflection mirror 200 (FIG. 2) of the scanning portion 104 takes a neutral state substantially intermediate between when the reflection mirror 200 is most displaced in a counterclockwise direction and when it is most displaced in a clockwise direction, with the torsion spring 202 at a center. For instance, when the reflection mirror 200 is most displaced in a counterclockwise direction with the torsion spring 202 at a center, laser light L2 enters a lowermost position of the screen 110. On the contrary, when the reflection mirror 200 is most displaced in a clockwise direction with the torsion spring 202 at a center, laser light L3 enters an uppermost position of the screen 110.

The connecting portion 120 has a member (hereinafter referred to as "thermal fuse") that melts when light is irradiated from the scanning portion 104 at energy equal to or more than the predetermined energy. As the thermal fuse, a metal member that has the electrical conductivity and melts by heating at a relatively low temperature such as zinc, lead, alloys of lead and tin or mixtures of these with bismuth or cadmium can be used. The predetermined energy at which the thermal fuse begins melting is energy substantially same as energy that is imparted to an irradiating surface, for instance, when the laser light is scanned at the maximum intensity in accordance with an image signal. The connecting portion 120 is melted when the laser light is irradiated at energy equal to or more than necessary for displaying an image. Furthermore, the thermal fuse is formed into a thin wire shape. The thermal fuse, when melted, can be easily cut. When the thermal fuse is cut, the connecting portion 120 cuts the electrical connection between the light source 101 and the external power source.

When the scanning portion 104 is normally operating, the laser light from the scanning portion 104 is scanned past over the connecting portion 120. Since the connecting portion 120 is formed into a thin wire shape, even when the connecting portion 120 is disposed at a position where light from the scanning portion 104 is shielded, an influence on the observation of an image by an observer can be reduced. It is assumed that for some reason in spite of the laser light from the light source 101 being supplied an anomaly that the scanning portion 104 is stopped from driving occurs. During the electrostatic force that is the driving force being stopped from generating, the scanning portion keeps reflecting the laser light L1 in a direction of the connecting portion 120.

When the scanning is stopped in spite of the continuation of the supply of the laser light, energy larger than that when the laser light is scanned is imparted on an irradiating surface. When the laser light L1 is kept irradiating onto the connecting portion 120, the connecting portion 120 is imparted from the laser light L1 with energy larger than the predetermined energy that is imparted when the laser light of the maximum intensity in accordance with the image signal is scanned. When the laser light L1 imparts energy equal to or larger than the predetermined energy, thereby the thermal fuse of the connecting portion 120 is melted and cut. When the thermal fuse is cut, the connecting portion 120 cuts electrical connection between the light source 101 and the external power source. The image display device 100, when the electrical connection is cut at the connecting portion 120, stops supplying electric power from the external power source to the light source 101. When the supply of the electric power from the external power source is stopped, the light source 101 stops supplying the laser light.

Furthermore, without restricting to an irregular case where the drive of the scanning portion 104 is stopped, also when the scanning portion 104 is driven at a speed slower than that when the scanning portion is normally driven, on the irradiation position of the laser light, in some cases, energy equal to or more than the predetermined energy may be imparted. In the connecting portion 120, also when the scanning portion 104 is driven at a speed slower than that when the scanning portion 104 is normally driven, energy equal to or more than the predetermined energy is imparted, and thereby the electrical connection between the light source 101 and the external power source can be cut. Still furthermore, also when owing to the anomaly of the light source 101 the laser light was supplied at energy stronger than normal, according to the invention, the laser light can be stopped supplying.

Thus, the image display device 100, when the laser light is irradiated at energy equal to or more than the predetermined energy, at the connecting portion 120, cuts the electrical connection between the light source 101 and the external power source. Since the electric power supply to the light source 101 is stopped to stop the supply of the laser light, the laser light can be cut more directly and assuredly than controlling the light source 101 through a complicated control circuit. Furthermore, before a situation that the laser light is emitted outside of the chassis 107 is caused, at the time when light is irradiated at energy equal to or more than the predetermined energy, the laser light inside of the chassis 107 can be stopped supplying. Accordingly, inconvenient situations such as damage of the device owing to the continuation of the supply of the laser light can be avoided. Thereby, when the anomaly occurs in the scanning of the beam-like light, inconvenient situations can be assuredly avoided. The connecting portion 120 has only to be disposed at a position where laser light L2 that proceeds through the scanning portion 104 where the driving force is stopped generating enters; that is, it is not restricted to a configuration where the connecting portion 120 is disposed at a position shown in the drawings.

Figure 4:
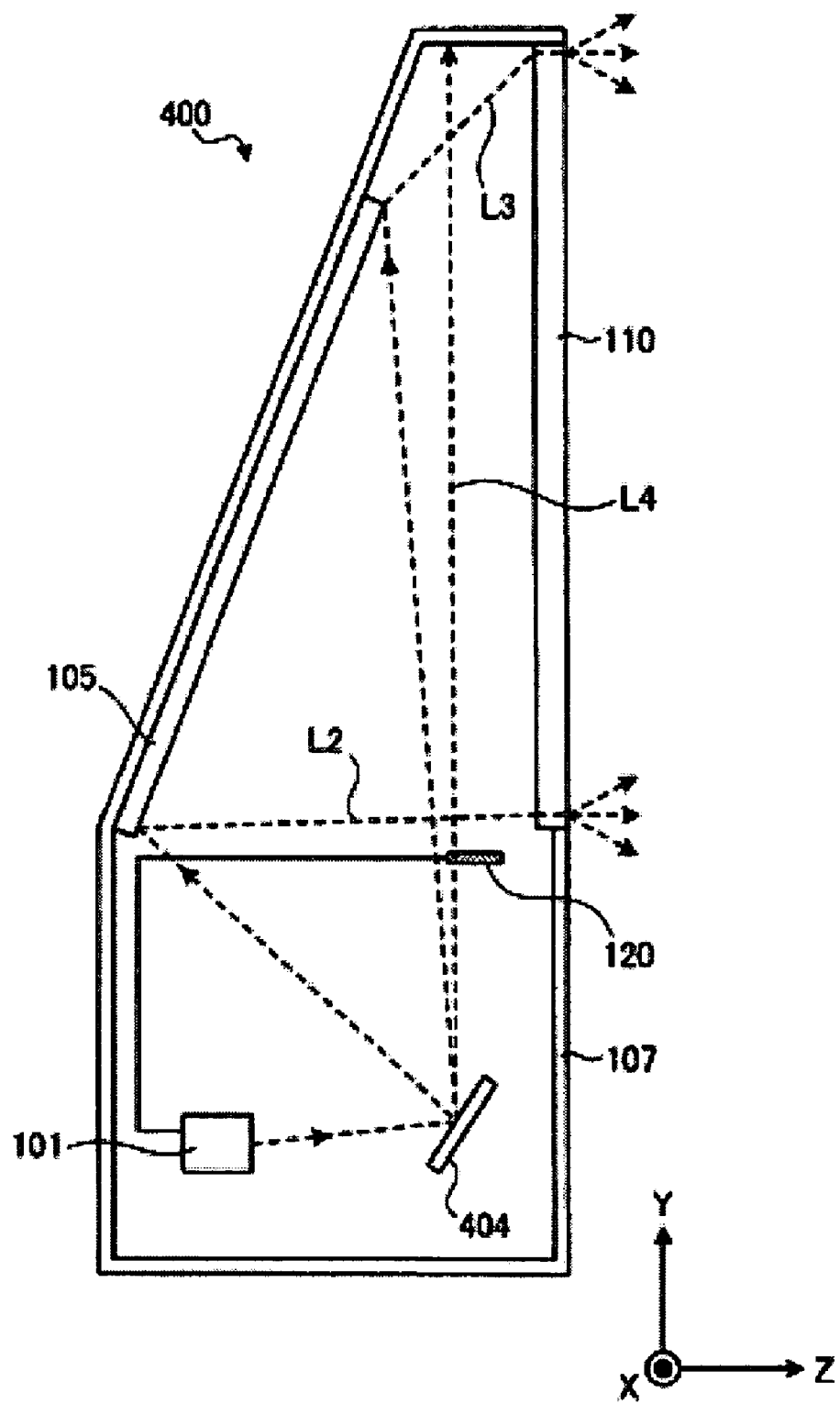
FIG. 4 is a diagram showing a schematic configuration of an image display device according to a modification example of the Example 1.

FIG. 4 shows a schematic configuration of an image display device 400 according to a modification example of the example 1. The image display device 400 according to the modification example has a scanning portion 404 that, when the driving force is stopped from generating, makes the laser light enter a position different from a position on an image display region. While the scanning portion 404 is driving normally, the laser light from the scanning portion 404 enters through a reflecting portion 105 on a screen 110 that is an image display region. The scanning portion 404, when the driving force is stopped from generating, makes laser light L4 enter in a direction different from that of the reflecting portion 105 that is a direction for making the laser light L4 enter on the screen 110. The connecting portion 120 is disposed in an optical path of the laser light L4 past through the scanning portion 404 when the driving force is stopped from generating.

Figure 5:
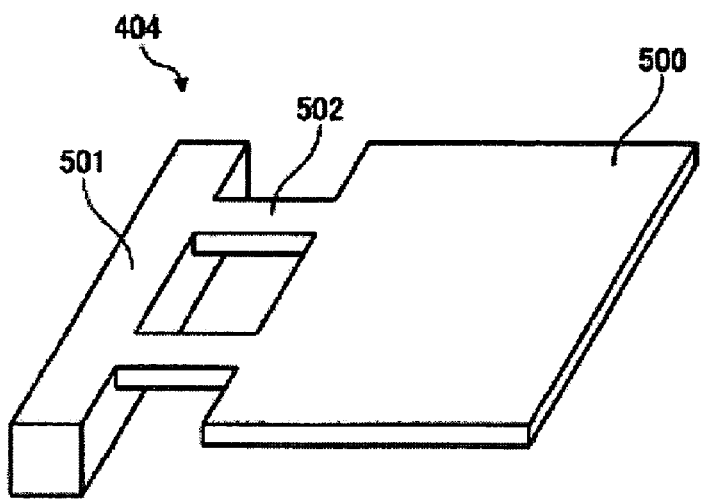
FIG. 5 is a diagram showing a perspective configuration of the scanning portion.

FIG. 5 is a diagram showing a perspective configuration of the scanning portion 404. A reflection mirror 500 of the scanning portion 404 is connected to a fixing portion 501 with a cantilever 502. For instance, the scanning portion 404 is driven when the electrostatic force is generated between the reflection mirror 500 and a not shown electrode. When the electrostatic force is not at all generated, the reflection mirror 500 is in a state substantially in parallel with a not shown reference surface on which the fixing portion 501 is disposed.

When the electrostatic force becomes larger than a force necessary for deflecting the cantilever 502, the reflection mirror 500 is displaced so as to tilt relative to the reference surface. When the electrostatic force is made disappear, the reflection mirror 500, owing to the restoring force of the cantilever 502, is displaced so as to return to an original state. The reflection mirror 500 is displaced so as to alter the tilting by making use of the deflection of the cantilever 502 and the restoring force to the original state.

The scanning portion 404 may be formed in a bimorph actuator that makes use of layers different in the thermal expansion coefficient. For instance, to the cantilever 502, two layers different in the thermal expansion coefficient are disposed. By supplying electric current thereto, the cantilever 502 is heated. When an upper layer expands more than a lower layer, the cantilever 502 deforms so as to deflect. Furthermore, when the heat generation is stopped, the cantilever 502 returns to an original state. Thus, the reflection mirror 500 can be displaced. The reflection mirror 500, without restricting to a configuration where the upper layer of the cantilever 502 is expanded to displace, may take a configuration where the lower layer is contracted relative to the upper layer to displace.

When the maximum driving force that most largely deflects the cantilever 502 is generated, the scanning portion 404 makes the laser light L2 enter at the lowermost position of the screen 110 (FIG. 4). On the other hand, the scanning portion 404, when the driving force is stopped from generating, makes the laser light L4 enter a position different from that on the screen 110 that is an image display region. When the laser light L2 is made enter at the uppermost position of the screen 110, the reflection mirror 500 takes an intermediate state between a state where the driving force is largest and a state where the driving force is stopped.

While the scanning portion 404 is normally driven, the laser light from the scanning portion 404 scans without going past on the connecting portion 120. When, for some troubles, an anomaly that, in spite of the laser light from the light source 101 being kept supplying, the drive of the scanning portion 404 is stopped is caused, the scanning portion 404 continues reflecting the laser light L4 toward the connecting portion 120. Thereafter, when the laser light L4 imparts energy equal to or larger than the predetermined energy, the connecting portion 120 cuts the electrical connection between the light source 101 and the external power source.

When the configuration where when the driving force is stopped the laser light is entered at a position different from that on the screen 110 that is an image display region is taken, at a position that does not shield the laser light that enters the screen 110, the connecting portion 120 may be disposed. Thereby, without at all affecting on an image, the connecting portion 120 can be disposed. The image display device 400 according to the modification example may use the scanning portion 104 that is disposed to the image display device 100. Furthermore, to the image display device 100, the scanning portion 404 that is disposed to the image display device 400 according to the modification example may be used.

EXAMPLE 2

Figure 6:
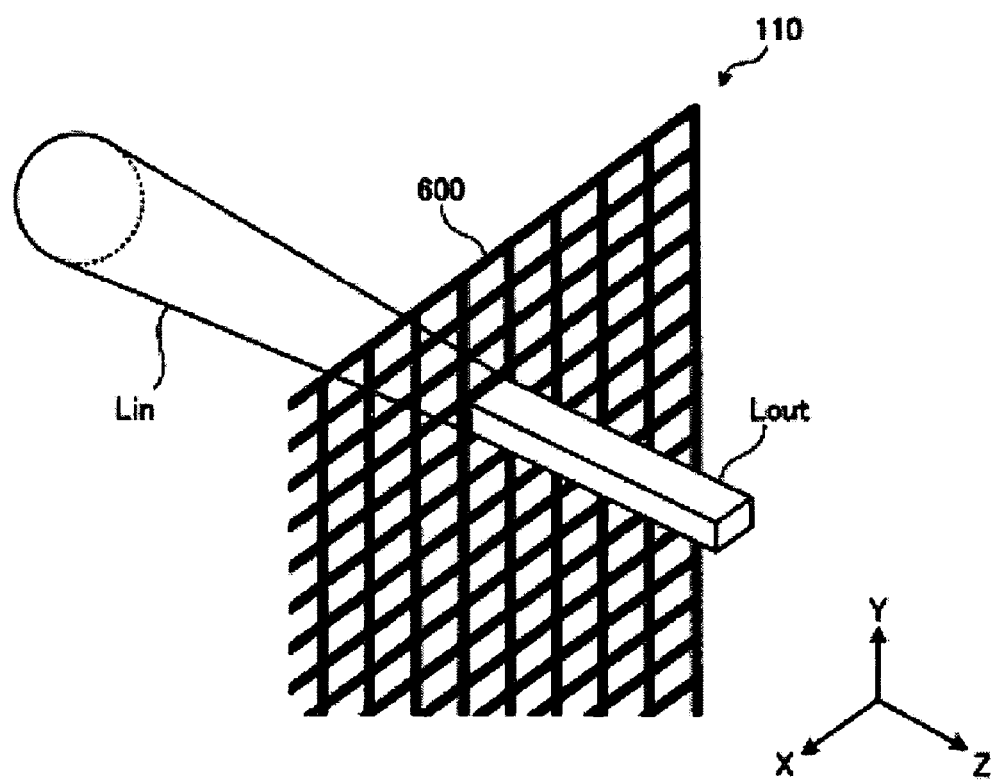
FIG. 6 is a diagram that describes an image display device according to Example 2 of the invention.

FIG. 6 is a diagram for explaining an image display device according to Example 2 of the invention. In the image display device according to the example, a connecting portion is disposed between pixels of an image displayed on a screen 110. In the example, the connecting portion is a black matrix portion 600 disposed on the screen 110. The image display device according to the example has, except that in place of the connecting portion 120 it has the black matrix portion 600, a configuration similar to the image display device 100 according to the example 1. In the example, like ones as the example 1 are omitted from illustrating and explaining. FIG. 6 is a diagram showing, as a characteristic portion of the image display device according to the example, a perspective configuration of the black matrix portion 600 of the screen 110.

The black matrix portion 600 is disposed in lattice on the periphery of an opening that transmits the laser light. When a pixel of an image is disposed for each of the openings, the black matrix portion 600 is disposed between individual pixels. The black matrix portion 600 plays a role of, in addition to inhibiting stray light from entering from an entrance side, inhibits ambient light from an observer side from being reflected. When the laser light is stopped from emitting from the opening, black color is displayed. Accordingly, the black matrix portion 600 inhibits the ambient light from being reflected and thereby exhibits a function of improving the contrast of an image.

Furthermore, on an entrance side of the opening, a lenticular lens or a micro-lens is disposed to focus incident light Lin and thereby to make light enter the opening. The black matrix portion 600 as well plays a role of shaping the incident light Lin into exit light Lout shaped in the form of a pixel. When the exit light Lout is shaped in a shape of pixel, a high-definition image can be displayed. The black matrix portion 600, without restricting to shaping in lattice, may be shaped in stripe of which longer side is in a horizontal direction or a vertical direction.

Figure 7:
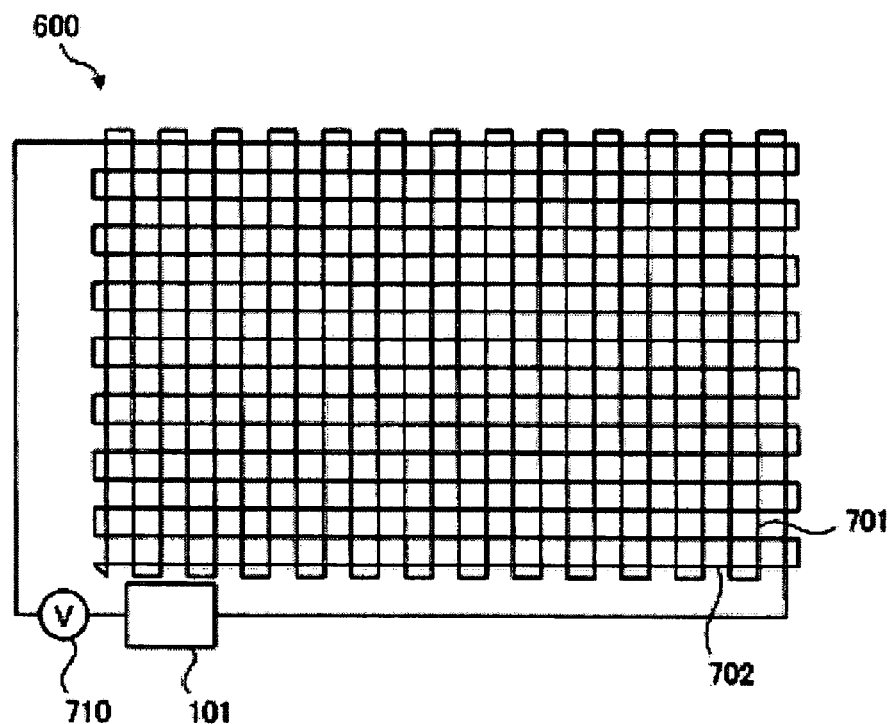
FIG. 7 is a diagram showing an example of a circuit configuration for driving a light source.

FIG. 7 is a diagram showing an example of a circuit configuration for driving the light source 101. The black matrix portion 600 is constituted by serially connecting an interconnection 701 in a vertical direction and an interconnection 702 in a horizontal direction. The interconnection 701 in a vertical direction and the interconnection 702 in a horizontal direction are disposed through an insulating layer made of, for instance, an insulating member. Furthermore, the black matrix portion 600 is connected in series with the light source 101 and an external power source 710.

When the laser light stops scanning at a certain position of the screen 110, at a position where the laser light is irradiated, the electrical connection of the black matrix portion 600 is cut. When a configuration where the black matrix portion 600 functions as a connecting portion is taken, in the case where the laser light is irradiated on any position on the screen 110 at energy equal to or more than the predetermined energy, the supply of the laser light from the light source 101 can be cut. Furthermore, also in the case where the laser light stops at either position on the screen 110, the supply of the laser light can be cut. Furthermore, in a mode that does not at all affect on an image, the connecting portion can be disposed. The circuit configuration including the black matrix portion 600 may be one that is capable of cutting the supply of the electric power to the light source 101 when the electrical connection is cut at any position and is not restricted to the illustrated one.

EXAMPLE 3

Figure 8:
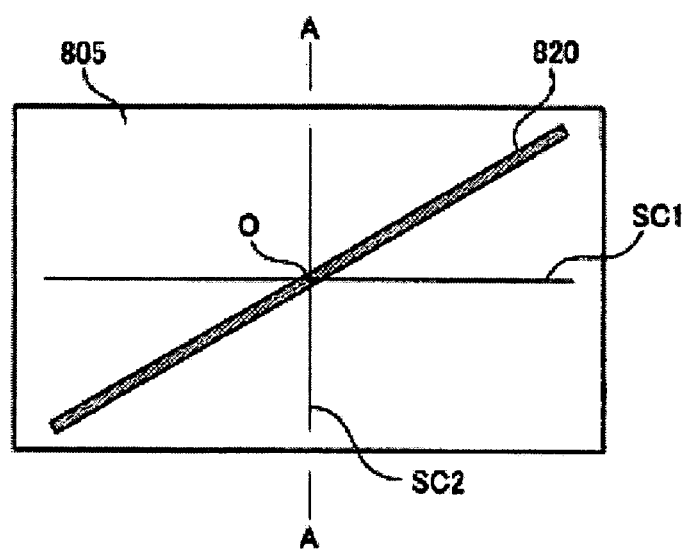
FIG. 8 is a diagram that describes an image display device according to Example 3 of the invention.

FIG. 8 is a diagram for explaining an image display device according to Example 3 of the invention. In the image display device according to the example, a connecting portion 820 is disposed to a reflecting portion 805. The image display device according to the example has a configuration same as that of the image display device 100 according to the example 1 except that, in place of the connecting portion 120, a connecting portion 820 is disposed on the reflecting portion 805. In the example, like ones as the example 1 are omitted from illustrating and explaining. FIG. 8 shows, as a characteristic portion of the image display device according to the example, a plan structure of the reflecting portion 805 seen from a side of the screen 110. The connecting portion 820, similarly to the connecting portion 120 according to the example 1, has a thin wire-like thermal fuse.

Figure 9:
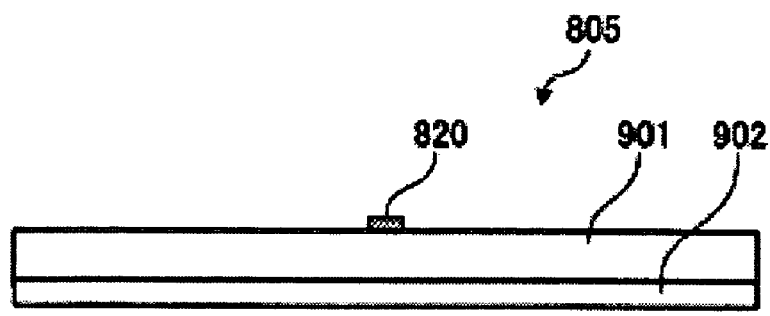
FIG. 9 is a diagram showing a sectional configuration of the reflecting portion.

FIG. 9 is a diagram showing a configuration of an AA section of the reflecting portion 805 shown in FIG. 8. A reflective film 902, a transparent layer 901 and the connecting portion 820 are laminated to form the reflecting portion 805. The reflective film 902 is made of a highly reflective member such as aluminum or aluminum alloys. The transparent layer 901 is a parallel plate made of such as glass. The connecting portion 820 is a surface on a side of the screen 110 of the reflecting portion 805 and disposed on the transparent layer 901.

The laser light that scans the screen 110 scans also on the reflecting portion 805 that reflects the laser light from a scanning portion 104 same as on the screen 110. When the laser light is scanned in a horizontal direction on the screen 110, on the reflecting portion 805 the laser light is scanned in a horizontal direction. Furthermore, when the laser light is scanned in a vertical direction on the screen 110, on the reflecting portion 805 the laser light is scanned in a up and down direction. The scanning portion 104, on the reflecting portion 805, makes the laser light from the light source 101 scan in a horizontal direction that is a first direction and in a up and down direction that is a second direction substantially perpendicular to the first direction.

Returning to FIG. 8, the connecting portion 820 is formed so as to go past on a center position O of the reflecting portion 805 and to tilt to both the horizontal direction that is the first direction and the up and down direction that is the second direction. In other words, the connecting portion 820 is formed on a diagonal line of the reflecting portion 805 that forms a rectangle. For instance, it is assumed that for some troubles, the drive of the scanning portion 104 for scanning the laser light in an up and down direction on the reflecting portion 805 is stopped. When the reflection mirror 200 is left in a neutral state so as to make the laser light enter a substantial center position in the up and down direction, only the scanning in the horizontal direction is continued. Accordingly, the laser light depicts on the reflecting portion 805 a scanning track SC1 that forms a central line that divides the reflecting portion 805 up and down.

Separately from the above, it is assumed that for separate troubles, the drive of the scanning portion 104 for scanning the laser light in a horizontal direction on the reflecting portion 805 is stopped. When the reflection mirror 200 is left in a neutral state so as to make the laser light enter a substantial center position in the horizontal direction, only the scanning in the up and down direction is continued. Accordingly, the laser light depicts on the reflecting portion 805 a scanning track SC2 that forms a central line that divides the reflecting portion 805 left and right.

While the scanning portion 104 is normally driven, the laser light from the scanning portion 104 is scanned past over the connecting portion 820. Since the connecting portion 820 is formed in a thin wire shape, even when the connecting portion 820 is disposed at a position that shields the laser light, an influence on the observation of an image by an observer can be reduced. Now, it is assumed that for some troubles the drive of the scanning portion 104 in any one of two-dimensional directions in which the laser light is scanned is stopped. In this case, the scanning of the laser light in any one of the two-dimensional directions is continued. Accordingly, the laser light, on the reflecting portion 805, is linearly scanned in the horizontal direction or vertical direction.

Since the connecting portion 820 is formed so as to tilt to both the horizontal direction and the up and down direction on the reflecting portion 805, when the scanning of the laser light is stopped in any one direction of the horizontal direction and the up and down direction on the reflecting portion 805, the laser light from the scanning portion 104 necessarily goes past over the connecting portion 820. When the scanning of the laser light is stopped in any one direction of the horizontal direction and the up and down direction and thereby energy equal to or more than the predetermined energy is imparted to the connecting portion 820, the connecting portion 820 cuts the electrical connection between the light source 101 and the external power source. Thereby, similarly to the example 1, when an anomaly is generated to the scanning of the laser light, an inconvenient situation can be assuredly avoided from occurring.

When the connecting portion 820 is formed so as to tilt to both the first direction and the second direction in which the laser light is scanned, it can be constituted so that, when the scanning of the laser light in any one direction of the first direction and the second direction is stopped, light from the scanning portion 104 may enter the connecting portion 820. Thereby, with a simple configuration and effectively, an anomaly of the scanning portion 104 can be detected and an inconvenient situation can be avoided from occurring. The connecting portion 820, without restricting to the case where it is formed so as to go past over a center position O, may be formed so as not to go past over the center position O. Furthermore, of the reflecting portion 805, at a position where the laser light from the scanning portion 104 where the generation of the driving force is stopped enters, the connecting portion 820 may be disposed.

Figure 10:
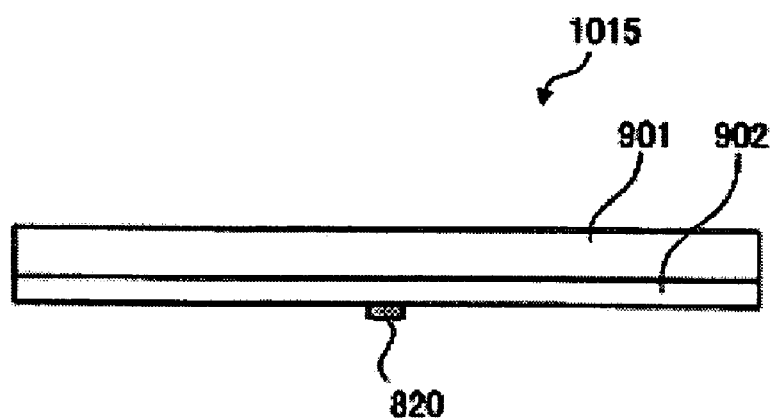
FIG. 10 is a diagram showing a sectional configuration of an essential part of the reflecting portion according to a modification example of the Example 3.

FIG. 10 is a diagram showing a sectional configuration of an essential part of a reflecting portion 1015 according to a modified example of the invention. The reflecting portion 1015 can be applied to the abovementioned image display devices. In the modification example, in the reflecting portion 1015, a connecting portion 820 is disposed on a back side that is an opposite side from the screen 110 side relative to the reflective film 902. In the modification example, when the scanning of the laser light in any one of the horizontal direction and the up and down direction is stopped, the laser light having energy equal to or larger than the predetermined energy is irradiated on the reflective film 902. When the laser light having energy equal to or larger than the predetermined energy is irradiated, the reflective film 902 is melted at a portion where the laser light is irradiated. When a portion where the laser light is irradiated of the reflective film 902 is melted, the reflecting portion 1015 stops reflecting the laser light. Thereby, firstly the laser light is stopped from exiting from the screen 110.

After the reflective film 902 is melted at a position where the laser light is irradiated, the laser light enters the connecting portion 820 formed on a backside of the reflective film 902. Thus, when, owing to an anomaly of the scanning portion 104, the laser light enters the reflecting portion 1015 at energy equal to or more than the predetermined energy, the reflective film 902 is melted and the connecting portion 820 is melted. Thereby, the electrical connection between the light source 101 and the external power source is cut.

When the connecting portion 820 is disposed on a side opposite to a side of the screen 110 relative to the reflective film 902 of the reflecting portion 1015, at a position that does not shield the laser light that is normally scanned, the connecting portion 820 can be disposed. Thereby, in a mode that does not at all affect on an image, the connecting portion 820 can be disposed, and thereby, when the laser light enters the reflecting portion 1015 at energy equal to or larger than the predetermined energy, the supply of the laser light from the light source 101 can be cut.

In the respective examples, the image display device is configured so as to use the light source 101 that supplies the laser light. However, the light source 101, as far as it is configured so as to be able to supply beam-like light, is not restricted thereto. For instance, the light source 101 may be configured so as to use a solid light-emitting element such as a light-emitting diode (LED).

As mentioned above, the image display device according to the invention is suitable for an image display device that scans laser light in accordance with an image signal to display an image.

The entire disclosure of Japanese Patent Application No. 2005-072431, filed Mar. 15, 2005 is expressly incorporated by reference herein.

What is claimed is:

1. An image display device comprising:
a light source that supplies light;
a scanning portion that scans the light from the light source to display an image by using light from the scanning portion; and a connecting portion that electrically connects the light source and an external power source that supplies electric power to the light source;

the connecting portion being disposed on an optical path of the light from the light source past the scanning portion, and when the light is irradiated from the scanning portion at energy equal to or more than a predetermined energy, the connecting portion disconnects an electrical connection between the light source and the external power source.

2. The image display device according to claim 1;

the connecting portion including a member that is melted when the light is irradiated from the scanning portion at energy equal to or more than the predetermined energy.

3. The image display device according to claim 1;

the scanning portion being driven in accordance with a driving force to scan the light from the light source; and the connecting portion being disposed at a position where the light enters the scanning portion.

4. The image display device according to claim 3;

the scanning portion modulating the light in accordance with an image signal scan in an image display region and, under the condition that the driving force is stopped, the scanning portion makes the light enter a position different from positions on the image display region.

5. The image display device according to claim 1, further comprising:

a screen that allows transmission of the light from the scanning portion, and the connecting portion being disposed between pixels of an image displayed on the screen.

6. The image display device according to claim 1, further comprising:

a screen that allows transmission of the light from the scanning portion; and a reflecting portion that reflects the light from the scanning portion toward the screen, the connecting portion being disposed in the reflecting portion.

7. The image display device according to claim 6;

the scanning portion scanning the light in a first direction and a second direction, the second direction being substantially perpendicular to the first direction; and the connecting portion being formed to tilt to both the first direction and the second direction.

8. The image display device according to claim 6;

the reflecting portion including a reflective film that reflects the light from the scanning portion; and the connecting portion being disposed on a side opposite to a side of the screen with respect to the reflective film.

* * * * *